US011089467B2

(12) United States Patent
Affeldt

(10) Patent No.: US 11,089,467 B2
(45) Date of Patent: Aug. 10, 2021

(54) METHOD AND APPARATUS FOR DEVICE DETECTION AND DETECTION MANAGEMENT WITHIN A VEHICLE

(71) Applicant: Ford Global Technologies, LLC, Dearborn, MI (US)

(72) Inventor: Matthew Affeldt, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/175,900

(22) Filed: Oct. 31, 2018

(65) Prior Publication Data

US 2020/0137547 A1    Apr. 30, 2020

(51) Int. Cl.
*H04W 8/00*    (2009.01)
*H04W 4/48*    (2018.01)

(52) U.S. Cl.
CPC ............. *H04W 8/005* (2013.01); *H04W 4/48* (2018.02)

(58) Field of Classification Search
CPC combination set(s) only.
See application file for complete search history.

(56) References Cited

U.S. PATENT DOCUMENTS

| 9,070,276 | B2 | 6/2015 | Le et al. | |
|---|---|---|---|---|
| 10,214,118 | B1 * | 2/2019 | Jain | B60K 37/06 |
| 10,303,961 | B1 * | 5/2019 | Stoffel | B60Q 3/76 |
| 2010/0188226 | A1 | 7/2010 | Seder et al. | |
| 2016/0314681 | A1 * | 10/2016 | Zhijian | H04W 4/029 |
| 2017/0048376 | A1 * | 2/2017 | Logan | G05B 15/02 |

* cited by examiner

*Primary Examiner* — Saba Tsegaye
(74) *Attorney, Agent, or Firm* — Michael Spenner; Brooks Kushman P.C.

(57) ABSTRACT

A vehicle system is provided. The vehicle system may include a processor configured to detect a wireless device based on a received device signal when a vehicle is at an origin location, add the detected device to a tracking list, register a trigger event away from the origin location, and, responsive to detection of the trigger event, attempt to detect devices on the tracking list. The processor may be further configured to report, to a vehicle occupant, all devices on the tracking list not detected by the attempt. The received device signal may be from a radio-frequency identification sensor. The received device signal may transfer to the processor via Wi-Fi. The received device signal may transfer to the processor via BLUETOOTH. The trigger event may be a vehicle start-up.

18 Claims, 5 Drawing Sheets

METHOD AND APPARATUS FOR DEVICE DETECTION AND DETECTION MANAGEMENT WITHIN A VEHICLE

TECHNICAL FIELD

The illustrative embodiments generally relate to methods and apparatuses for detecting devices within a vehicle and managing responses for different types of detection.

BACKGROUND

Vehicle drivers and passengers typically travel with at least one electronic device such as a cellular phone or tablet. These electronic devices may be left or forgotten at a location prior to entering a vehicle. For example, if a driver typically carries a cellular device in a purse or bag, the driver may not notice whether the cellular device is present within the purse or bag upon entering the vehicle.

People often also leave their devices at away-from-home locations, such as at restaurants, the office, a store, etc. If a device was used at such a location, and then set down, the person may not realize they have left the device behind. Further, if a journey included many stops, the person may not even realize where the device was left if the device later turns up missing.

SUMMARY

A vehicle system includes a processor configured to detect a wireless device based on a received device signal when a vehicle is at an origin location, add the detected device to a tracking list, register a trigger event away from the origin location, and, responsive to detection of the trigger event, attempt to detect devices on the tracking list. The processor is further configured to report, to a vehicle occupant, all devices on the tracking list not detected by the attempt. The received device signal may be from a radio-frequency identification sensor. The received device signal may transfer to the processor via Wi-Fi. The received device signal may transfer to the processor via BLUETOOTH. The trigger event may be a vehicle start-up. The trigger event may be an open or close of a vehicle door. The tracking list may include at least one device not detected during the detecting at the origin location, but being detected at previous times, at the origin location, more than a predefined threshold number of times. The tracking list may include at least one device not detected during the detecting at the origin location but designated by the vehicle occupant as being present.

A method includes, responsive to a detected trigger event and a device tracking list including at least one device, attempting to communicate with all devices on the tracking list via vehicle wireless communication, and reporting, to a vehicle occupant, all devices on the tracking list for which communication was unavailable via the vehicle wireless communication. The wireless communication may be via radio-frequency identification. The wireless communication may be via Wi-Fi. The wireless communication may be via BLUETOOTH. The detected trigger event may be a vehicle state change component and a vehicle location component. The vehicle location component may be a vehicle location other than a predefined origin location. Different devices on the tracking list may have different origin locations associated therewith. The vehicle location component for detecting a given device may be the predefined origin location associated with a respective device. The trigger event may be a vehicle start-up as the vehicle state change component. The trigger event may be an opening or closing of a door.

A vehicle system includes a processor configured to detect a first trigger event indicating passenger pickup, to detect a previously undetected wireless device based on a received device signal within a predefined time-period of the first trigger event and associate the previously undetected device with the picked-up passenger, to detect a second trigger event indicating the picked-up passenger has left the vehicle, and responsive to detection of the second trigger event, to output a notification signal when a device, associated with the passenger, is detected within the vehicle. The first trigger event may include one of a door opening, a door closing, or a seat sensor indicating presence of the passenger, coupled with a pickup request identifying the passenger and a vehicle GPS location corresponding to the pickup request. The second trigger event may be one of a door opening and subsequently closing, coupled with a drop-off request identifying the passenger and a vehicle GPS location corresponding to the drop-off request.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
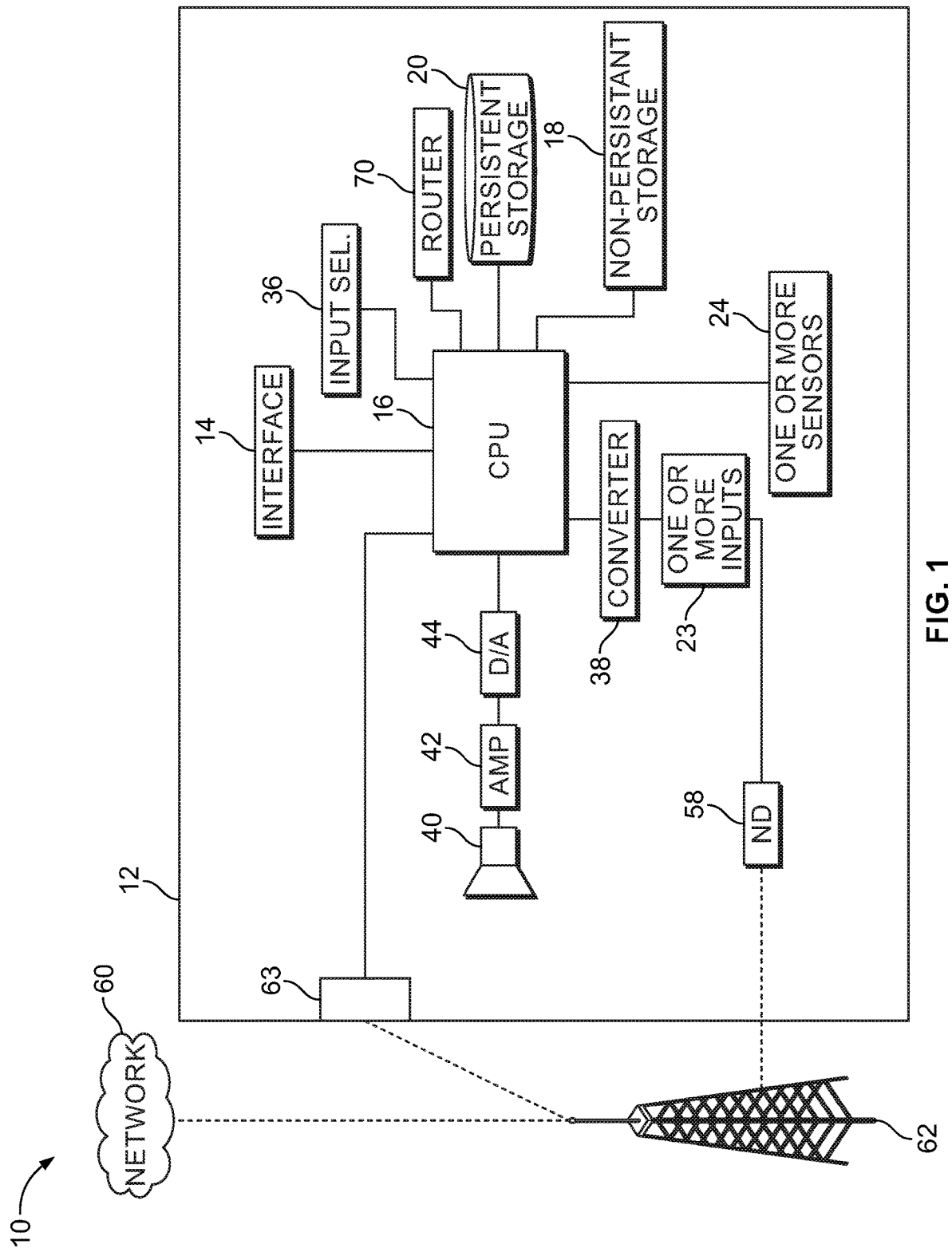
FIG. 1 is a schematic diagram illustrating an example of a vehicle computing system.

FIG. 1 is a schematic diagram illustrating an example of a vehicle-based computing system (VCS) 10 for a vehicle 12. One example of such a VCS 10 is a system referred to as SYNC and manufactured by THE FORD MOTOR COMPANY. The vehicle 12 may include a vehicle cabin interface 14 located in a cabin of the vehicle 12 for a user to interact with the VCS 10. The interface 14 may be, for example, a touchscreen display. Alternatively, the user may interact with the VCS 10 through button presses to a mechanical interface, through a spoken dialog system with automatic speech recognition, or through speech synthesis.

A controller, such as a central processing unit (CPU) 16, may execute onboard processing of commands and routines to control portions of VCS 10 operation. The CPU 16 may include programming to direct operation of components of the vehicle 12 and to facilitate interaction with vehicle 12 passengers. The CPU 16 may be referred to as a processor or a controller and may include, for example, an arithmetic logic unit, a control unit, a cache, at least one processor, and one or more transistors. Further, the CPU 16 may be connected to one or both of a non-persistent storage 18 and a persistent storage 20. The non-persistent storage 18 may be, for example, a random-access memory (RAM) and the persistent storage 20 may be, for example a hard disk drive (HDD) or flash memory. In general, persistent (non-transitory) memory may include all forms of memory that maintain data when a computer or other device is powered down. These include, but are not limited to, HDDs, CDs, DVDs, magnetic tapes, solid state drives, portable USB drives, and any other suitable form of persistent memory.

The vehicle 12 may also include one or more inputs 23 to facilitate user and vehicle 12 interaction with one or more devices. The one or more inputs 23 may be configured to accommodate connection to the one or more devices such as, for example, a microphone, an auxiliary device, a USB device, a GPS device, the interface 14, and a BLUETOOTH device.

The vehicle 12 may include one or more sensors 24 in communication with the CPU 16 to detect a presence of the one or more devices within the vehicle 12. Examples of the one or more sensors include a BLUETOOTH sensor and a radio-frequency identification (RFID) sensor. It is contemplated that a type of sensor may be selected to detect the one or more devices when in a power on status and when in a power off status. The CPU 16 may include programming and/or a control strategy to output a notification to a passenger based on whether the one or more sensors 24 detects one of the one or more devices as further described herein.

An input selector 36 may be in communication with the CPU 16 and facilitate user transition between the one or more devices connected via the one or more inputs 23. Where necessary, device input signals from the one or more inputs 23 may be converted from analog to digital by a converter 38 before being passed to the CPU 16.

Outputs to passengers of the vehicle 12 may include, but are not limited to, a visual display on the interface 14 and an audio output to a speaker 40. The speaker 40 is connected to an amplifier 42 and receives instructions via signals from the CPU 16 through a digital-to-analog (D/A) converter 44. Outputs from the CPU 16 may also be transmitted to the one or more devices in communication with the CPU 16 via the one or more inputs 23 or via a wireless communication.

In one example, the VCS 10 may use a BLUETOOTH device in communication with the CPU 16 via one of the one or more inputs 23 to communicate with a user's nomadic device (ND) 58 (e.g., cell phone, smart phone, PDA, or any other device having wireless remote network connectivity). The ND 58 may communicate with a network 60 external to the vehicle 12 via one or more connections to an antenna 62. The vehicle 12 may include a transceiver unit 63 to facilitate communication between the CPU 16 and a source external the vehicle 12, such as the network 60 via the antenna 62. In another example, the ND 58 may communicate with the network 60 via a Wi-Fi access point. In yet another example, the ND 58 may be paired with the vehicle 12 via a BLUETOOTH connection or other connection.

Pairing the ND 58 with a transceiver, such as a BLUETOOTH transceiver in communication with the CPU 16, may be instructed through a button or similar input. Accordingly, the CPU 16 may be instructed that the onboard BLUETOOTH transceiver will be paired with a BLUETOOTH transceiver in the ND 58.

Data may be communicated between the CPU 16 and the network 60 by utilizing, for example, a data-plan, data over voice, or dual-tone multi-frequency (DTMF) tones associated with the ND 58. Alternatively, it may be desirable to include a modem on board the vehicle 12 in order to communicate data between the CPU 16 and the network 60.

The ND 58 may then be used to communicate with the network 60 through, for example, communication with the antenna 62. In some embodiments, the modem may establish communication with the antenna 62 for communicating with the network 60. The modem may be, for example, a USB cellular modem and the communication may be, for example, cellular communication.

The CPU 16 may include an operating system having an application programming interface (API) to communicate with modem application software to access an embedded module or firmware to complete wireless communication with, for example, a remote BLUETOOTH transceiver (which may be included in the ND 58). Bluetooth is a subset of the IEEE 802 PAN (personal area network) protocols. IEEE 802 LAN (local area network) protocols include Wi-Fi and have cross-functionality with IEEE 802 PAN. Both are suitable for wireless communication within a vehicle. Another communication means that may be used in this realm is free-space optical communication (such as IrDA) and non-standardized consumer IR protocols.

Additional sources that may interface with the vehicle 12 via the CPU 16 include a personal navigation device, a vehicle navigation device, an onboard GPS device, or remote navigation system having connectivity to the network 60.

Further, the CPU 16 may be in communication with a variety of other devices. These devices may be connected through a wireless or wired connection. Examples of the devices include personal media players, wireless health devices, portable computers, and the like. The CPU 16 may connect with a vehicle router 70 to, for example, connect to remote networks in range of the router 70.

The CPU 16 may include programming to direct execution of one or more control strategies to identify whether a particular device is present in the vehicle 12 at an associated location and to notify a vehicle passenger of whether the particular device is present or not present. For example, the CPU 16 may include programming relating to an auto-enrollment management control strategy, a manual enrollment management control strategy, and a notification management control strategy as further described herein.

The CPU 16 may include programming to create one or more notification lists relating to detected conditions, such as the associated location, of one or more electronic devices. In one example, the CPU 16 may include programming to associate numerical values with the one or more electronic devices based on conditions detected within the vehicle 12 and further to notify vehicle 12 passengers whether the one or more electronic devices are present within the vehicle 12 based on the numerical values and the conditions.

Figure 2:
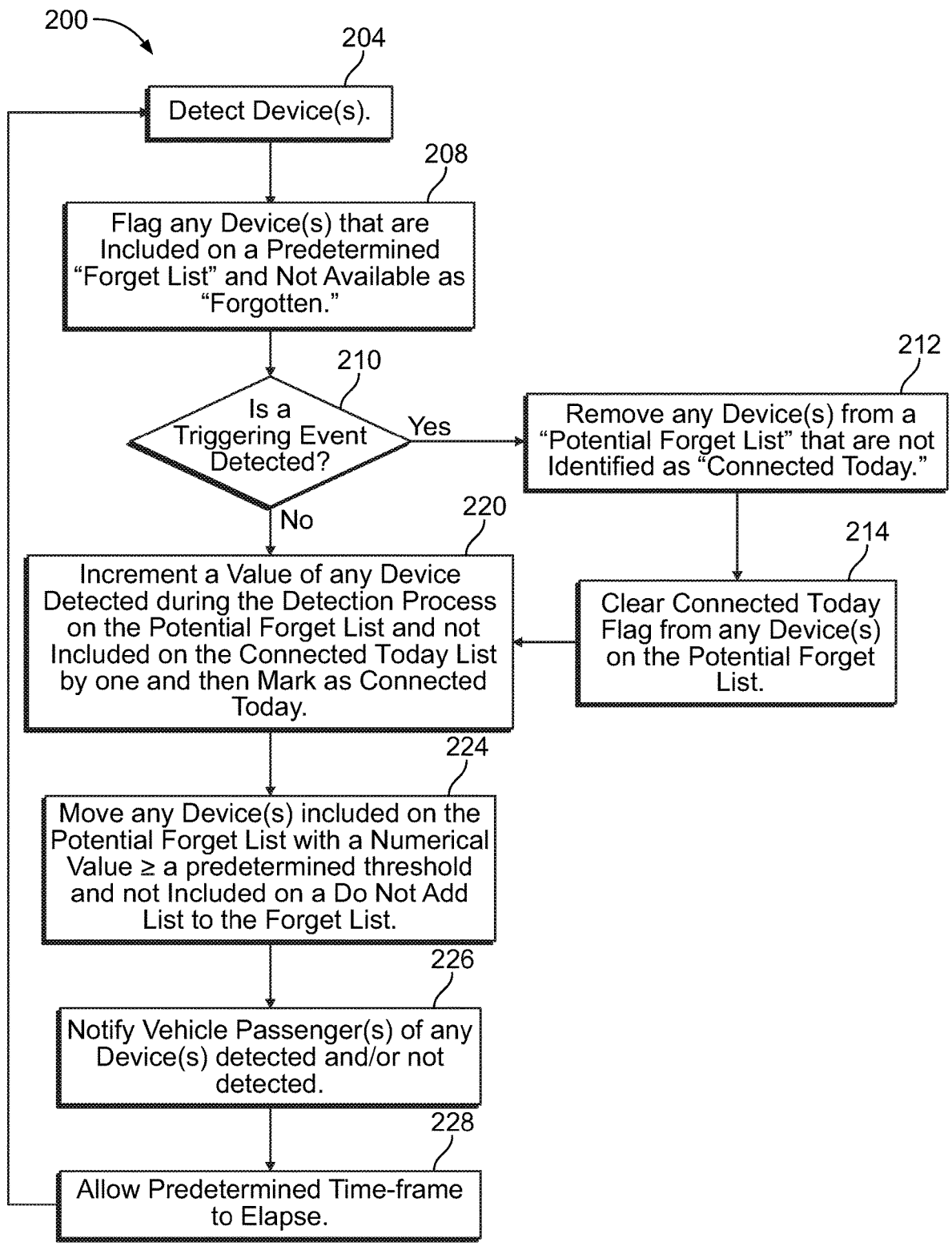
FIG. 2 is a flow chart illustrating an example of an auto-enrollment management process.

FIG. 2 illustrates an example of an auto-enrollment management control strategy, referred to generally as a control strategy 200 herein. In this example, the control strategy 200 operates to identify electronic devices present in a vehicle at an associated location and to identify whether a particular device should be enrolled on a "Notify List." The Notify List may be a list of devices reflecting devices for which a notification may be output to a vehicle passenger when the particular device is detected within the vehicle at an associated location or detected as missing from the vehicle.

Alternatively, the control strategy 200 may operate to receive a sensor signal reflective of whether one or more electronic devices is detected in the vehicle at the associated location to define a "Potentially Expected List." The processor may then track the detections over a predetermined time-period and update the Potentially Expected List to define an "Expected List" of the devices and associated vehicle locations in which the devices should be present within the vehicle. In one example, the predetermined time-period may be a time-period between one and two weeks. Devices on the Expected List may include characteristics similar to the devices included on the Notify List.

For example, if the vehicle is at a home location, a vehicle system of the vehicle may detect any devices that are within the vehicle upon a vehicle start-up. This may include active detection (e.g., BLUETOOTH) and passive detection (e.g., RFID from the vehicle to a device in a power off status). The detected devices may then make up the Notify List, reflecting all devices detected as being present with the vehicle passenger within the vehicle. Additionally, under certain circumstances, the Expected List may include devices that are historically present. This feature may be useful if a particular device lacks a passive ID method (e.g., no RFID functionality), but is also commonly present with a vehicle passenger based on historic observation. For example, a primary cell phone may be on such a list and thus, even if the cell phone is in a power off status or the cell phone is not present, the vehicle may treat the phone as present for illustrative inquiries and the like. While this feature may result in a minor number of false positives, this feature may also improve left-behind device prevention and optionally may be disabled by the vehicle occupant.

Operation of the control strategy 200 may be triggered periodically at predetermined time intervals, by occurrence of a predetermined triggering event, or by detection of predetermined conditions. The control strategy 200 may operate such that the processor learns which electronic devices to include on the Notify List over a time-period and/or with passenger input as further described herein.

In operation 204, a component of a vehicle system, such as the CPU 16 of the VCS 10, may initiate an electronic device detection process. For example, a processor, such as a processor of the CPU 16, may activate a sensor, such as the one or more sensors 24, or a device detection unit to detect whether one or more electronic devices are present in a vehicle and categorize the detected one or more electronic devices on a "Device Present List." In another example, the processor may identify whether any electronic devices are connected via vehicle inputs, such as the one or more inputs 23.

The processor may also detect whether any electronic devices are linked to the vehicle via, for example, a USB, Wi-Fi, or BLUETOOTH connection. Examples of the one or more electronic devices may include a mobile phone, a tablet, a laptop, or other similar devices. The initiation of the electronic device detection process may be triggered by occurrence of an event or condition, such as a vehicle start-up or identification of a particular vehicle location, such as a passenger's home. Additionally, the processor may connect with a global positioning unit of the vehicle system to identify the particular vehicle location.

In operation 208, the processor may flag any of the one or more electronic devices included on a "Forget List" and not available as "Forgotten." The Forget List may include a list of devices that have been previously identified as a device the processor should not look for or should not output a notification relating to detection. A device flagged as Forgotten may be excluded from future status lists output to the passenger. The passenger may identify whether a device should be flagged as Forgotten via a cabin interface, such as the interface 14. For example, the passenger may confirm whether the device should be included on the Notify List or whether the device should be removed from the Notify List and flagged as Forgotten.

In operation 210 the processor may check the vehicle system to identify whether a triggering event is detected. Examples of the triggering event include a vehicle start-up, a vehicle stop condition over a predetermined time-period, a gear shift from PARK, or a vehicle stop at a particular location. It is contemplated that the processor may detect whether multiple triggering events occur at a same time, such as a vehicle start-up at a passenger's home. The processor may further operate to identify a detection time-period associated with detection of the device and the associated vehicle location. In one example, the detection time-period may be a time-period associated with a typical first vehicle start-up of a day.

In the event the processor identifies occurrence of the predetermined event or condition, such as a first vehicle start-up of the day, the processor may remove any of the one or more electronic devices from a "Potential Forget List" that are not identified as "Connected Today" in operation 212. The Potential Forget List may be, for example, a list of devices identified for the processor to potentially remove from the detection process. The Connected Today list may be, for example, a list of devices identified as connected to the vehicle during the detection process. The processor may then clear any of the one or more electronic devices identified as Connected Today from the Potential Forget List in operation 214.

In operation 220, the processor may increment a numerical value associated with a device detected during the detection process on the Potential Forget List and not identified as Connected Today by one and then mark the same device as Connected Today.

In operation 224, the processor may move any devices included on the Potential Forget List with a numerical value greater than or equal to a predetermined threshold and not included on a Do Not Add List to the Forget List. In one example, the predetermined threshold may be equal to five. As such, any devices to which the processor has assigned a numerical value greater than or equal to five may be moved to the Forget List so that the device is not included in future detection processes executed by the processor.

In operation 226, the processor may output a status of any electronic devices detected and/or not detected during the detection process. For example, the processor may output audio via vehicle speakers or output a list to a display of the cabin interface indicating devices identified as Connected Today. In the event the processor has previously identified a device as Connected Today and does not detect that same device during the detection process, the processor may output a notice to a vehicle passenger indicating that the device is not present and may have been forgotten by the vehicle passenger. Further, the processor may output a notice to the vehicle passenger in the event the processor has previously identified a device as Connected Today and does not detect the device at the associated location.

For example, if the vehicle system detects a new device at the home location or another location, the vehicle system may add the device to the Notify List. Devices which are expected at a particular location (e.g., a laptop when leaving work) may also be added to the Notify List even the particular device is not detected. Then, if the vehicle stops at another location and the user exits the vehicle, then re-enters and restarts the vehicle, the vehicle system may detect whether expected devices are present within the vehicle. For non-detected devices, the vehicle system may notify the vehicle passenger that the non-detected device may be left behind.

In operation 228, the processor may allow a predetermined time-period to pass and then execute the control strategy 200 again beginning with operation 204. The predetermined time-period may be tunable and, in one example, a time-period of thirty seconds. As such, the control strategy 200 may assist in identifying devices typically in the vehicle at particular locations. Further, after an amount of time of executing the control strategy 200, the processor may enroll or remove devices from the Notify List based on the detection occurrences.

Figure 3:
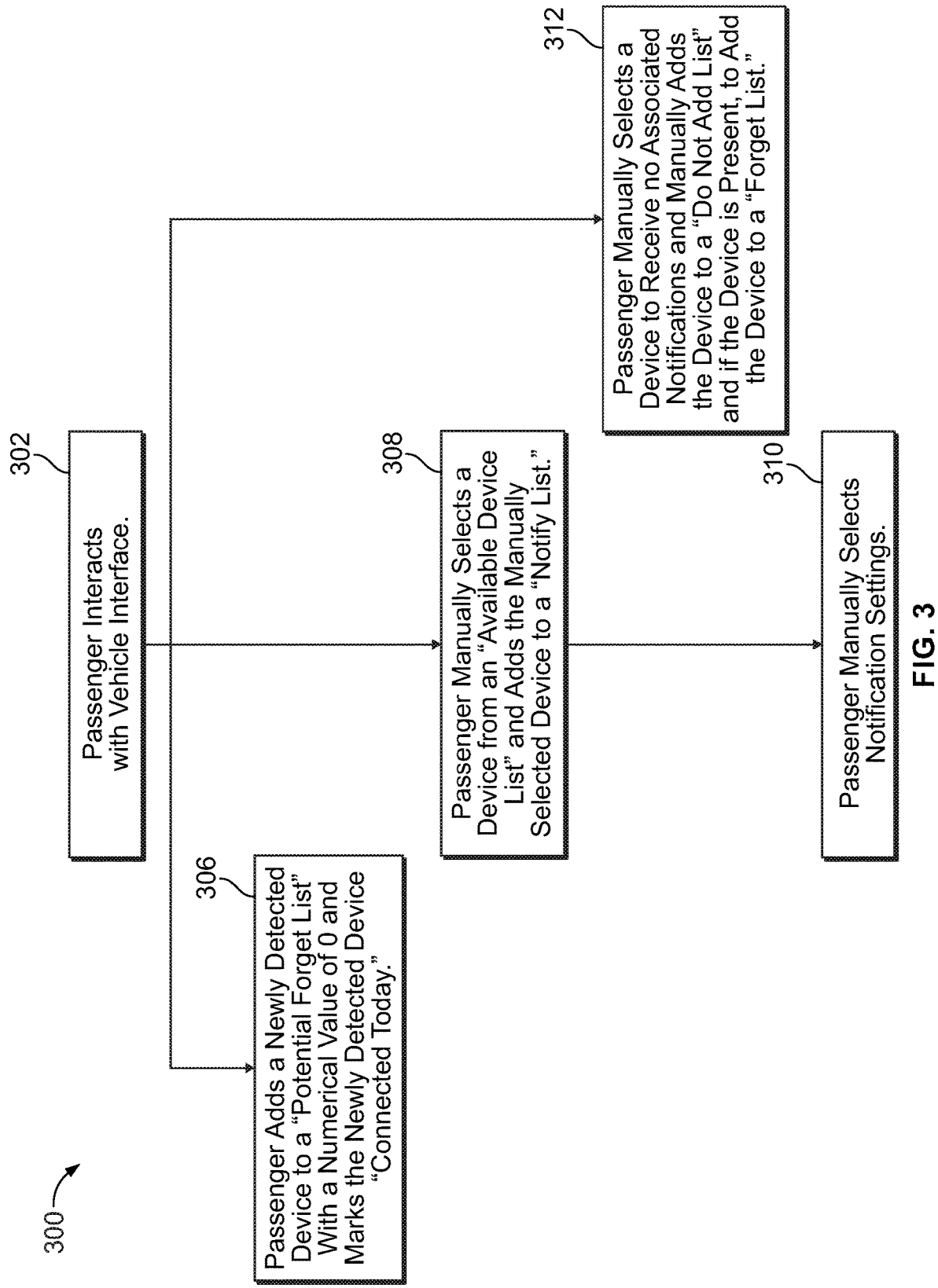
FIG. 3 is a flow chart illustrating an example of a manual-enrollment management process.

FIG. 3 illustrates an example of a manual-enrollment management control strategy, referred to generally as a control strategy 300 herein. In this example, the control strategy 300 operates to provide a vehicle passenger with one or more options to manually select whether to enroll or withdraw an electronic device from a device presence notification process.

In operation 302, a vehicle passenger may interact with a vehicle interface, such as the cabin interface 14, to manually identify electronic devices to associate with device presence notifications. For example, a controller may execute a device detection process, such as the process described above, to identify electronic devices present within the vehicle. The controller may then direct display of the identified electronic devices and associated locations on a device detection chart via the vehicle interface. The associated locations may be identified by the controller communicating with a global positioning unit upon detection of one of the electronic devices. The device detection chart may include selectable variables relating to a detection of the electronic devices within the vehicle at the associated locations. Examples of the selectable variables include an identified time-period, an identified device, and an identified vehicle location. As such, the passenger may, for example, manually direct the controller to output a notification responsive to a particular device being detected or not detected within the vehicle at a specific time and at a specific location.

By selecting the variables over a time-period, the passenger may manually define a learning path for the controller to define an "Expected List" of the electronic devices based on vehicle location. From the vehicle interface, the vehicle passenger may also select a manual enrollment option from a list of choices such as the options illustrated in operation 306, operation 308, and operation 310 of FIG. 3.

In operation 306, the passenger may manually add a newly detected device to a "Potential Forget List" with a numerical value of zero. The numerical value may be reflective of a count system in which a controller assesses numerical values to detected devices to categorize the devices for use with the control strategy 300. The passenger may further mark the newly detected device as Connected Today.

In operation 308, the passenger may manually add a device from an "Available Device List" to the Notify List. Devices included on the Available Device List may be reflective of devices identified by a device detection process such as the device detection process described in relation to FIG. 2. The control strategy 300 may then direct output of a notification indicating a presence of the device at a later time if the device is included on the Notify List and detected within the vehicle at a particular vehicle location.

For example, if the passenger may manually add a detected device to the Notify List, the vehicle interface may display selectable options relating to notification in operation 310. The selectable options may relate to an output format (e.g. audio or visual), a type of notification (e.g. a notice related to a forgotten device), triggering conditions for notification output (e.g. a vehicle start-up), and a timespan between executing the device detection process (e.g. thirty seconds).

In operation 312, the passenger may manually identify detected devices of which the passenger does not want to receive related notifications. For example, the passenger may manually add a detected device to a "Do Not Add List" so that the controller will not operate to output a notification indicating a presence of the device whether the device is detected.

Figure 4:
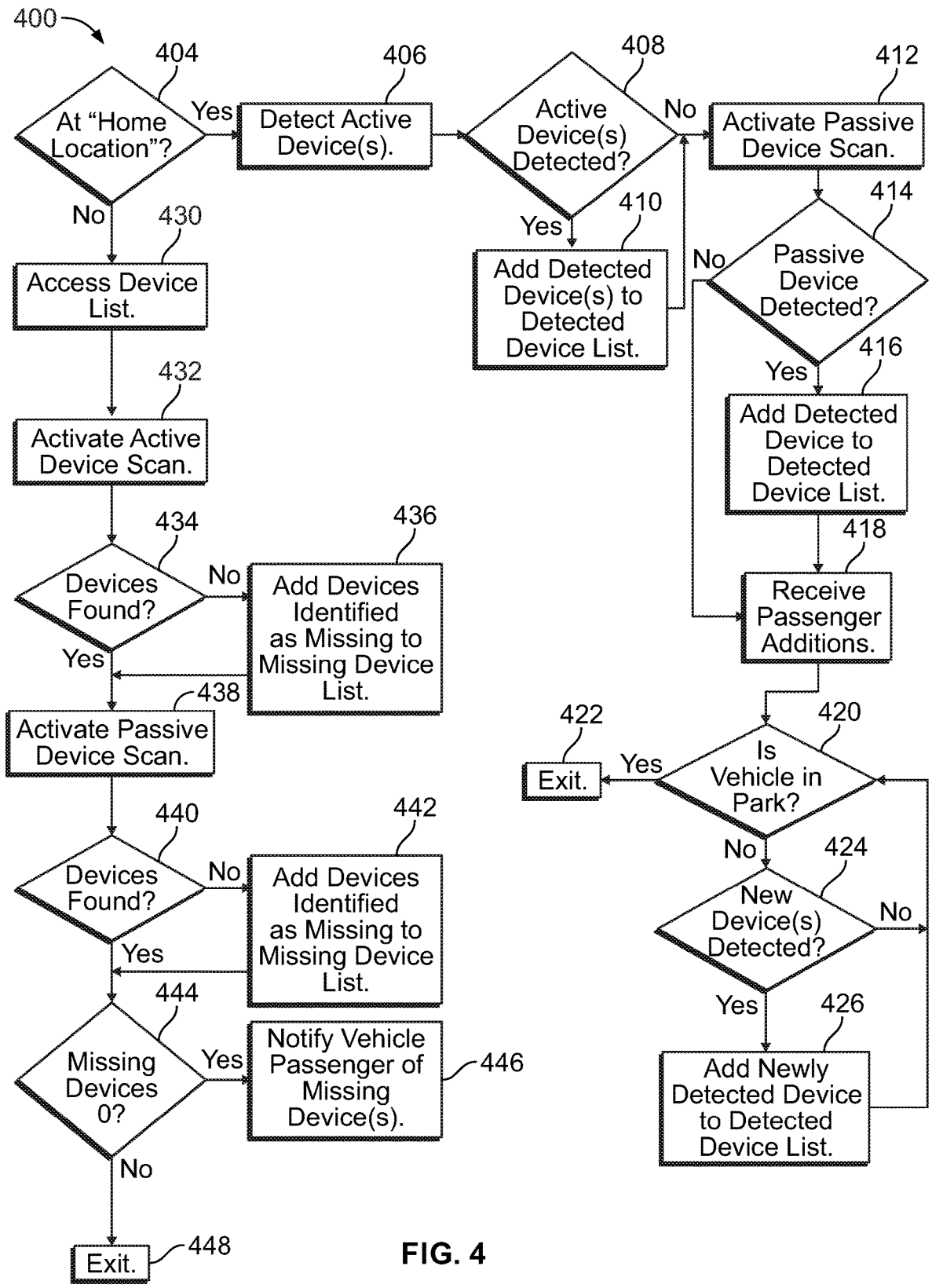
FIG. 4 is a flow chart illustrating an example of a notification management process.

FIG. 4 is a flow chart illustrating an example of a notification management control strategy, referred to generally as a control strategy 400 herein. In this example, the control strategy 400 may operate to identify conditions under which to alert a vehicle passenger of whether a device is present within the vehicle under various conditions. For example, a controller may operate to execute operation 404 upon detection of a vehicle start-up, an open/close cycling of vehicle doors, or upon detection of a gear shift and the vehicle moving at a speed above a predetermined threshold as further described below. For left-behind devices, the control strategy 400 may trigger a detection determination to identify whether the device was left-behind at a location other than where the device was first detected or expected.

For example, if the vehicle system detects a cell phone at a home location, the vehicle system may check for the cell phone being left-behind based on a vehicle start-up event at a location other than the home location. Additionally, if a device is added to the list based on being expected at a certain location, the vehicle system may run the detection at locations other than the certain location of the purposes of the left-behind determination.

In operation 404, the controller may communicate with a vehicle positioning system to identify whether the vehicle is at a "Home" location when the vehicle is started up. The Home location may be a location previously identified by a user and stored for access by the controller.

If the controller confirms that the vehicle is at the Home location (or any prespecified "origin" location where one or more devices is expected to be added to a device list of the vehicle) in operation 404, the controller may initiate a detection process to identify whether any electronic devices are active within the vehicle in operation 406. Active devices may include any electronic device including a power on status. If one or more active devices is identified in operation 408, the controller may add the active devices identified to a "Detected Device List" in operation 410.

If no active devices are identified in operation 408, or after any active devices are added, the controller may initiate a passive device scan in operation 412. The passive device scan may identify devices within the vehicle which may be in a power off status. For example, the controller may be in communication with one or more sensors to identify electronic devices powered off.

If the passive device scan identifies one or more devices in the vehicle in operation 414, the identified passive devices may be added to the Detected Device List in operation 416. If no devices are identified during the passive device scan in operation 414, the controller may prompt a vehicle passenger to manually identify a device in operation 418. For example, the controller may output a selection menu to a vehicle interface for the vehicle passenger to manually input or pair an electronic device.

The controller may then identify whether the vehicle is in park in operation 420 (which may also include a determination that the vehicle is away from an origin location). If the vehicle is in park, the controller may then direct an exit from the control strategy 400 in operation 422. In effect, this feature may allow the control strategy 400 to continue to direct a scan for new devices within the vehicle until the vehicle is parked away from the origin location. Thus, if a new device is powered on during vehicle movement, the control strategy 400 may still operate to detect and add the device to an appropriate list for reporting purposes.

If the vehicle is not identified as in park in operation 420, the controller may initiate another device detection scan in operation 424. If no devices are detection in operation 424, the controller may revert to operation 420. If new devices are detected in operation 424, the newly detected devices may be added to the Detected Device List in operation 426.

If the controller identifies that the vehicle is not in the Home location in operation 404, the controller may access a previously saved Device List in operation 430. The previously saved Device List may include a list of devices previously identified by the vehicle passenger for inclusion in device scans. In operation 432, the controller may initiate an active device scan to identify whether any devices on the previously saved Device List are present within the vehicle.

If the results of the active device scan indicate that one or more devices from the Device List are not present within the vehicle in operation 434, the controller may include the missing one or more devices on a Missing Device List in operation 436. After the controller identifies whether one or more devices are present in operation 434, the controller may then initiate a passive device scan in operation 438.

If the controller does not identify all expected devices with the passive device scan in operation 440, the controller may update the Missing Device List to include any remaining devices from the Device List that are not detected within the vehicle in operation 442.

If the Missing Device List includes one or more missing devices in operation 444, the controller may initiate a vehicle passenger notification in operation 446. For example, the controller may initiate an audio or visual output within the vehicle to alert the vehicle passenger to whether any devices from the Device List are present or not.

If the Missing Device List does not include any missing devices in operation 444, the controller may exit the control strategy 400 in operation 448. As such, the control strategy 400 may operate to assist in identifying whether electronic devices are present within a vehicle based on a detected vehicle location. The control strategy 400 may further operate to categorize detected devices in comparison to a previously saved device list to alert a vehicle passenger regarding presence of devices.

Figure 5:
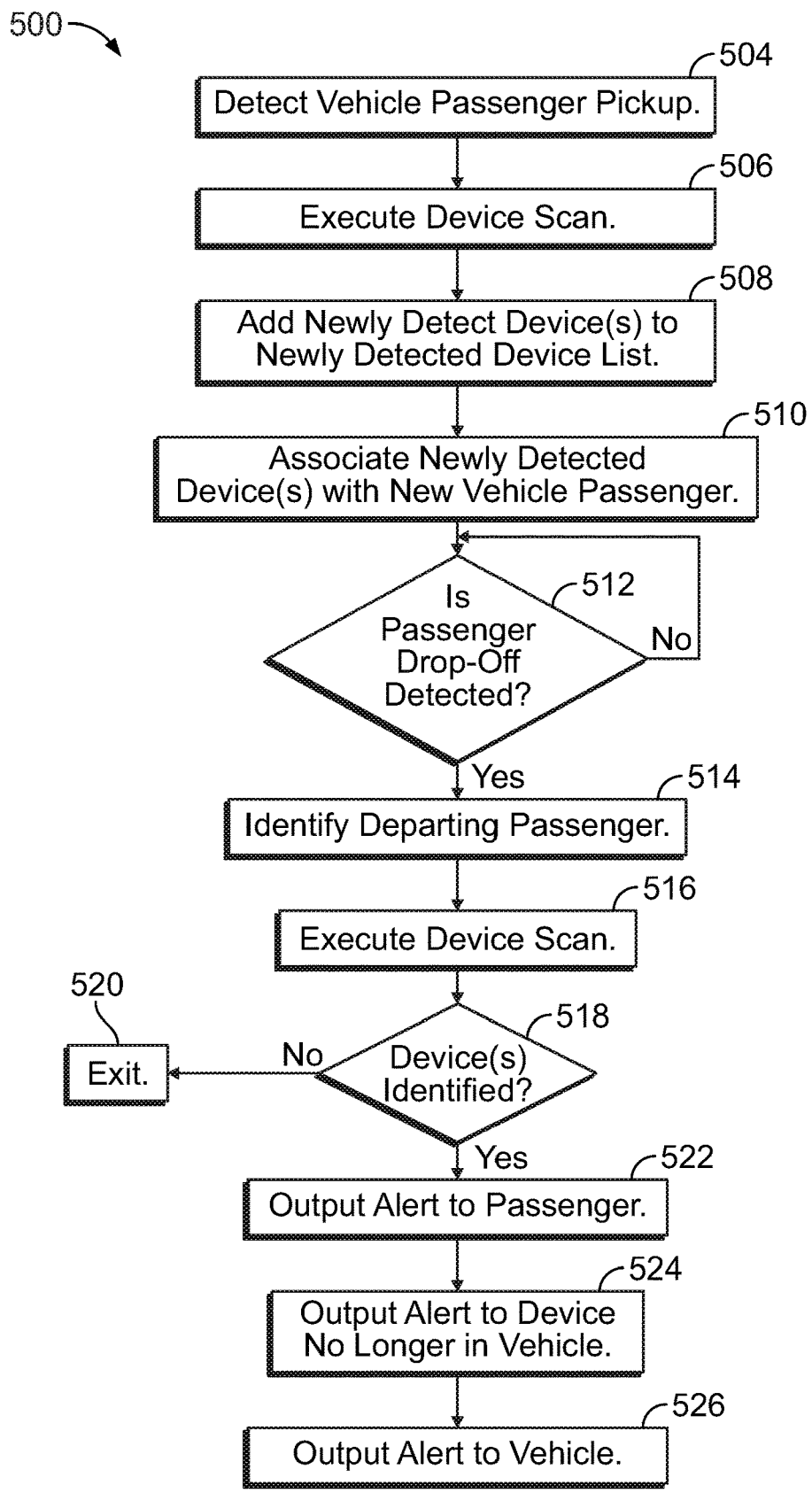
FIG. 5 is a flow chart illustrating an example of a passenger device detection and alert process.

FIG. 5 is a flow chart illustrating an example of another notification management control strategy, referred to generally as a control strategy 500 herein. In this example, the control strategy 500 may operate to identify conditions under which to alert a vehicle passenger of whether a device is present within the vehicle under various conditions such as ride-sharing conditions or autonomous vehicle conditions.

The control strategy 500 may be initiated by a controller upon detection of a vehicle passenger pickup in operation 504. For example, the controller may be in communication with one or more sensors to detect a passenger pickup based on a first trigger event identified by an occupant classification system. Trigger events identified by the occupant classification system may include a non-driver door opening, a weight increase detected in a non-driver seat by a seat sensor, or an image of the passenger in a non-driver seat as captured by a camera. The controller may then execute a device scan in operation 506. The device scan may be an active scan or a passive scan to identify devices within the vehicle regardless of operating status.

In effect, the pickup of the vehicle passenger is treated as conceptually being the home location for that particular passenger, which is when a device tracking list may be assembled for that passenger.

In operation 508, the controller may add any devices detected in operation 506 to a Newly Detected Device List. The controller may then associate the newly detected device with the identified passenger pickup in operation 510. For example, the controller may associate the passenger pickup in operation 504, such as a passenger door opening, with the device newly detected in operation 510.

If a passenger drop-off is detected based on a second trigger event in operation 512, the controller may then identify the departing passenger in operation 514. Examples of the second trigger event include a non-driver door opening, a non-driver door closing, or a seat sensor indicating the passenger is no longer positioned in a seat. The controller may access the previously saved passenger to device association to identify which passenger left the vehicle and which device should have left the vehicle with the passenger. In operation 516, the controller may initiate another device scan to identify devices within the vehicle.

If no device belonging to the departing passenger is identified in operation 518, the controller may then exit the control strategy 500 in operation 520. If one or more devices are identified in operation 518, the controller may output an alert to the vehicle passenger in operation 522. For example, the controller may direct an output of an audio or visual alert (external to the vehicle and noticeable by the departed passenger) to the vehicle passenger indicating whether any devices previously detected are no longer in the vehicle. As another example, the controller may initiate output of an alert to the device previously detected in the vehicle but no longer in the vehicle in operation 524. As yet another example, the controller may initiate output of an alert to the vehicle in operation 526.

As such, the control strategy 500 may operate to identify whether one or more new passengers is picked up by a vehicle and to associate newly detected devices with a particular new passenger to output alerts relating to a device presence status.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system for a vehicle comprising:
a processor configured to:
responsive to verifying the vehicle is located at a predefined original location via a vehicle positioning controller, activate an active device scan to detect a first wireless device based on a received device signal;
add the first wireless device to a tracking list;
activate a passive device scan to detect a presence of a second wireless device which is powered off and undetectable by the active device scan;
add the second device to the tracking list;

responsive to detecting a third device in a time frame defined as a period of time after the vehicle drives away from the original location but before the vehicle parks, add the third device to the tracking list;

responsive to detection of a predefined trigger event, verify a vehicle location via the vehicle positioning controller;

responsive to verifying the vehicle location being away from the original location, attempt to detect devices on the tracking list;

responsive to failing to detect one or more devices on the tracking list, add the one or more devices to a missing device list;

notify a vehicle occupant of the one or more devices in the missing device list to a vehicle user.

2. The system of claim 1, wherein the passive device scan is performed using a radio-frequency identification sensor.

3. The system of claim 1, wherein the received device signal of the active device scan transfers to the processor via Wi-Fi.

4. The system of claim 1, wherein the received device signal of the active device scan transfers to the processor via BLUETOOTH.

5. The system of claim 1, wherein the trigger event is the vehicle has parked at least once after leaving the original location.

6. The system of claim 1, wherein the trigger event is an open or close of a vehicle door.

7. The system of claim 1, wherein the tracking list includes at least one device not detected during the detecting at the origin location, but being detected at previous times, at the origin location, more than a predefined threshold number of times.

8. The system of claim 1, wherein the tracking list includes at least one device not detected during the detecting at the origin location but designated by the vehicle occupant as being present through manual input.

9. A method for a vehicle, comprising:
responsive to verifying the vehicle is located at a predefined original location via a vehicle positioning controller, activating an active device scan to detect a first wireless device based on a received device signal;
adding the first wireless device to a tracking list;
responsive to a user input indicative of a trigger event, registering the trigger event;
responsive to detecting the trigger event, verify a vehicle location via the vehicle positioning controller;
responsive to verifying the vehicle location being away from the original location, attempting to communicate with all devices on the tracking list via vehicle wireless communication;
reporting, to a vehicle occupant, all devices on the tracking list for which communication was unavailable via the vehicle wireless communication; and
responsive to detecting a third device in a time frame after the vehicle drives away from the original location before the vehicle parks, adding the third device to the tracking list,
wherein the tracking list includes at least one device not detected during the detecting at the origin location, but detected at previous times, at the origin location, more than a predefined threshold number of times.

10. The method of claim 9, wherein the wireless communication is via Wi-Fi.

11. The method of claim 9, wherein the wireless communication is via BLUETOOTH.

12. The method of claim 9, wherein the detected trigger event is a vehicle state change component and a vehicle location component.

13. The method of claim 12, wherein the vehicle location component includes a vehicle location other than a predefined origin location.

14. The method of claim 13, wherein different devices on the tracking list have different origin locations associated therewith, and wherein the vehicle location component for detecting a given device is the predefined origin location associated with a respective device.

15. The method of claim 12, wherein the trigger event is a vehicle start-up as the vehicle state change component.

16. The method of claim 9, further comprising:
activating a passive device scan to detect a presence of a second wireless device which is powered off and undetectable by the active device scan; and
adding the second device to the tracking list.

17. The method of claim 16, wherein the wireless communication is via radio-frequency identification.

18. The method of claim 9, wherein the tracking list includes at least one device not detected during the detecting at the origin location, but being detected at previous times, at the origin location, more than a predefined threshold number of times.

* * * * *